US012095533B2

(12) United States Patent
Zhu et al.

(10) Patent No.: US 12,095,533 B2
(45) Date of Patent: Sep. 17, 2024

(54) CHANNEL STATE INFORMATION CALCULATION

(71) Applicant: LENOVO (BEIJING) LIMITED, Beijing (CN)

(72) Inventors: Chenxi Zhu, Beijing (CN); Bingchao Liu, Beijing (CN); Wei Ling, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 616 days.

(21) Appl. No.: 17/275,693

(22) PCT Filed: Nov. 1, 2018

(86) PCT No.: PCT/CN2018/113456
§ 371 (c)(1),
(2) Date: Mar. 12, 2021

(87) PCT Pub. No.: WO2020/087451
PCT Pub. Date: May 7, 2020

(65) Prior Publication Data
US 2022/0029681 A1 Jan. 27, 2022

(51) Int. Cl.
*H04B 7/06* (2006.01)
*H04L 5/00* (2006.01)
(52) U.S. Cl.
CPC ......... *H04B 7/0626* (2013.01); *H04L 5/0048* (2013.01)
(58) Field of Classification Search
CPC ............... H04B 7/0626; H04B 7/0842; H04L 5/0048; H04L 1/0026
See application file for complete search history.

(56) References Cited

U.S. PATENT DOCUMENTS

2013/0301450 A1 11/2013 Geirhofer et al.
2019/0068303 A1* 2/2019 Gao ................... H04B 17/318
2019/0335475 A1* 10/2019 Liang ................. H04W 72/541
(Continued)

FOREIGN PATENT DOCUMENTS

CN 106209277 A 12/2016
WO 2018062833 A1 4/2018
(Continued)

OTHER PUBLICATIONS

Hou et al, "User Terminal and Wireless Communication Method", Mar. 26, 2020, WO, WO 2020059146, English language translation. (Year: 2020).*

(Continued)

*Primary Examiner* — Michael K Phillips
(74) *Attorney, Agent, or Firm* — Kunzler Bean & Adamson

(57) ABSTRACT

Apparatuses, methods, and systems are disclosed for channel state information calculation. One method (900) includes receiving (902) information indicating at least one channel state information reference signal resource for channel measurement transmitted from a first transmission resource and at least one non-zero-power channel state information reference signal resource for interference measurement transmitted from a second transmission resource. The method (900) includes determining (904) a channel state information reference signal resource and a non-zero-power channel state information reference signal resource for calculating channel state information. The method (900) includes calculating (906) the channel state information based on the channel state information reference signal resource and the non-zero-power channel state information reference signal resource. The channel state information reference signal resource and the non-zero-power channel state information reference signal resource are received using a receiving (Continued)

spatial filter. The method (900) includes transmitting (908) the channel state information.

18 Claims, 10 Drawing Sheets

(56) References Cited

U.S. PATENT DOCUMENTS

| | | | | |
|---|---|---|---|---|
| 2020/0036472 | A1* | 1/2020 | Kim | H04L 5/0051 |
| 2020/0244320 | A1* | 7/2020 | Wang | H04B 7/0456 |
| 2021/0297121 | A1* | 9/2021 | Hao | H04B 7/0626 |
| 2021/0314043 | A1* | 10/2021 | Hao | H04B 7/0417 |
| 2022/0006582 | A1* | 1/2022 | Yamada | H04W 16/28 |

FOREIGN PATENT DOCUMENTS

| | | | | |
|---|---|---|---|---|
| WO | 2018128940 | A2 | 7/2018 | |
| WO | WO-2018219068 | A1 * | 12/2018 | H04L 1/06 |
| WO | WO-2020059146 | A1 * | 3/2020 | |

OTHER PUBLICATIONS

Beijing Samsung Telecom R&D CT; Samsung Electroni, Dec. 7, 2016, CN, CN 106209277, English Language translation. (Year: 2016).*

Li et al., "Channel State Information Processing Method and Apparatus, Terminal and Base Station", Dec. 6, 2018, WO, English translation of WO 2018219068 (Year: 2018).*

3GPP, 3rd Generation Partnership Project; Technical Specification Group Radio Access Network; Remaining details on CSI measurement, 3GPP R1-1717422, Oct. 2017, pp. 1-6.

International Searching Authority, "Notification of Transmittal of the International Search Report and the Written Opinion of the International Searching Authority, or the Declaration", PCT/CN2018/113456, Nov. 1, 2018, pp. 1-6.

Alcatel-Lucent, "UE PMI feedback signalling for user pairing/coordination", 3GPP TSG RAN WG1 #54bis R1-083759, Sep. 29-Oct. 3, 2008, pp. 1-3.

Alcatel-Lucent, "UE PMI feedback signalling for user pairing/coordination", 3GPP TSG RAN WG1 #56 Meeting R1-090777, Feb. 9-13, 2009, pp. 1-4.

Samsung, "WI Proposal on NR MIMO Enhancements", 3GPP TSG RAN Meeting #80 RP-181453, Jun. 11-14, 2018, pp. 1-5.

3GPP, "3rd Generation Partnership Project; Technical Specification Group Radio Access Network; Evolved Universal Terrestrial Radio Access (E-UTRA); Physical layer procedures (Release 15)", 3GPP TS 36.213 V15.2.0, Jun. 2018, pp. 1-541.

3GPP, "3rd Generation Partnership Project; Technical Specification Group Radio Access Network; NR; Physical layer procedures for data (Release 15)", 3GPP TS 38.214 V15.2.0, Jun. 2018, pp. 1-94.

* cited by examiner

CHANNEL STATE INFORMATION CALCULATION

FIELD

The subject matter disclosed herein relates generally to wireless communications and more particularly relates to channel state information calculation.

BACKGROUND

The following abbreviations are herewith defined, at least some of which are referred to within the following description: Third Generation Partnership Project ("3GPP"), Acknowledge Mode ("AM"), Backhaul ("BH"), Broadcast Multicast ("BM"), Buffer Occupancy ("BO"), Base Station ("BS"), Bandwidth Part ("BWP"), Component Carrier ("CC"), Coordinated Multipoint ("CoMP"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Prioritization ("LCP"), Long Term Evolution ("LTE"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero-Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), Packet Switched ("PS"), Primary Synchronization Signal ("PSS"), Quasi Co-Located ("QCL"), Quality of Service ("QoS"), Radio Access Network ("RAN"), Radio Access Technology ("RAT"), Resource Element ("RE"), Rank Indicator ("RI"), Radio Link Failure ("RLF"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Service Data Unit ("SDU"), Subscriber Identity Module ("SIM"), Signal-to-Interference and Noise Ratio ("SINR"), Sequence Number ("SN"), Synchronization Signal ("SS"), SS/PBCH Block ("SSB"), Secondary Synchronization Signal ("SSS"), Time Division Multiplexing ("TDM"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Voice Over IP ("VoIP"), Visited Public Land Mobile Network ("VPLMN"), Worldwide Interoperability for Microwave Access ("WiMAX"), and Zero-Power ("ZP"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, channel state information feedback may be used. In such networks, the channel state information feedback may not be applicable to various network configurations.

BRIEF SUMMARY

Methods for channel state information calculation are disclosed. Apparatuses and systems also perform the functions of the apparatus. In one embodiment, the method includes receiving information indicating at least one channel state information reference signal resource for channel measurement transmitted from a first transmission resource and at least one non-zero-power channel state information reference signal resource for interference measurement transmitted from a second transmission resource. In certain embodiments, the method includes determining a channel state information reference signal resource of the at least one channel state information reference signal resource and a non-zero-power channel state information reference signal resource of the at least one non-zero-power channel state information reference signal resource for calculating channel state information. In some embodiments, the method includes calculating the channel state information based on the channel state information reference signal resource and the non-zero-power channel state information reference signal resource. In such embodiments, the channel state information reference signal resource and the non-zero-power channel state information reference signal resource are received using a receiving spatial filter. In various embodiments, the method includes transmitting the channel state information.

An apparatus for channel state information calculation, in one embodiment, includes a receiver that receives information indicating at least one channel state information reference signal resource for channel measurement transmitted from a first transmission resource and at least one non-zero-power channel state information reference signal resource for interference measurement transmitted from a second transmission resource. In various embodiments, the apparatus includes a processor that: determines a channel state information reference signal resource of the at least one channel state information reference signal resource and a non-zero-power channel state information reference signal resource of the at least one non-zero-power channel state information reference signal resource for calculating channel state information; and calculates the channel state information based on the channel state information reference signal resource and the non-zero-power channel state information reference signal resource. In such embodiments, the channel state information reference signal resource and the non-zero-power channel state information reference signal resource are received using a receiving spatial filter. In certain embodiments, the apparatus includes a transmitter that transmits the channel state information.

One method for channel state information calculation includes transmitting information indicating at least one channel state information reference signal resource for channel measurement transmitted from a first transmission resource and at least one non-zero-power channel state information reference signal resource for interference measurement transmitted from a second transmission resource. In some embodiments, the method includes transmitting quasi-colocation information corresponding to the first transmission resource. In certain embodiments, the method includes receiving channel state information calculated based on a channel state information reference signal resource of the at least one channel state information reference signal resource and a non-zero-power channel state information reference signal resource of the at least one non-zero-power channel state information reference signal resource.

An apparatus for channel state information calculation, in one embodiment, includes a transmitter that: transmits information indicating at least one channel state information reference signal resource for channel measurement transmitted from a first transmission resource and at least one non-zero-power channel state information reference signal resource for interference measurement transmitted from a second transmission resource; and transmits quasi-colocation information corresponding to the first transmission resource. In various embodiments, the apparatus includes a receiver that receives channel state information calculated based on a channel state information reference signal resource of the at least one channel state information reference signal resource and a non-zero-power channel state information reference signal resource of the at least one non-zero-power channel state information reference signal resource.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
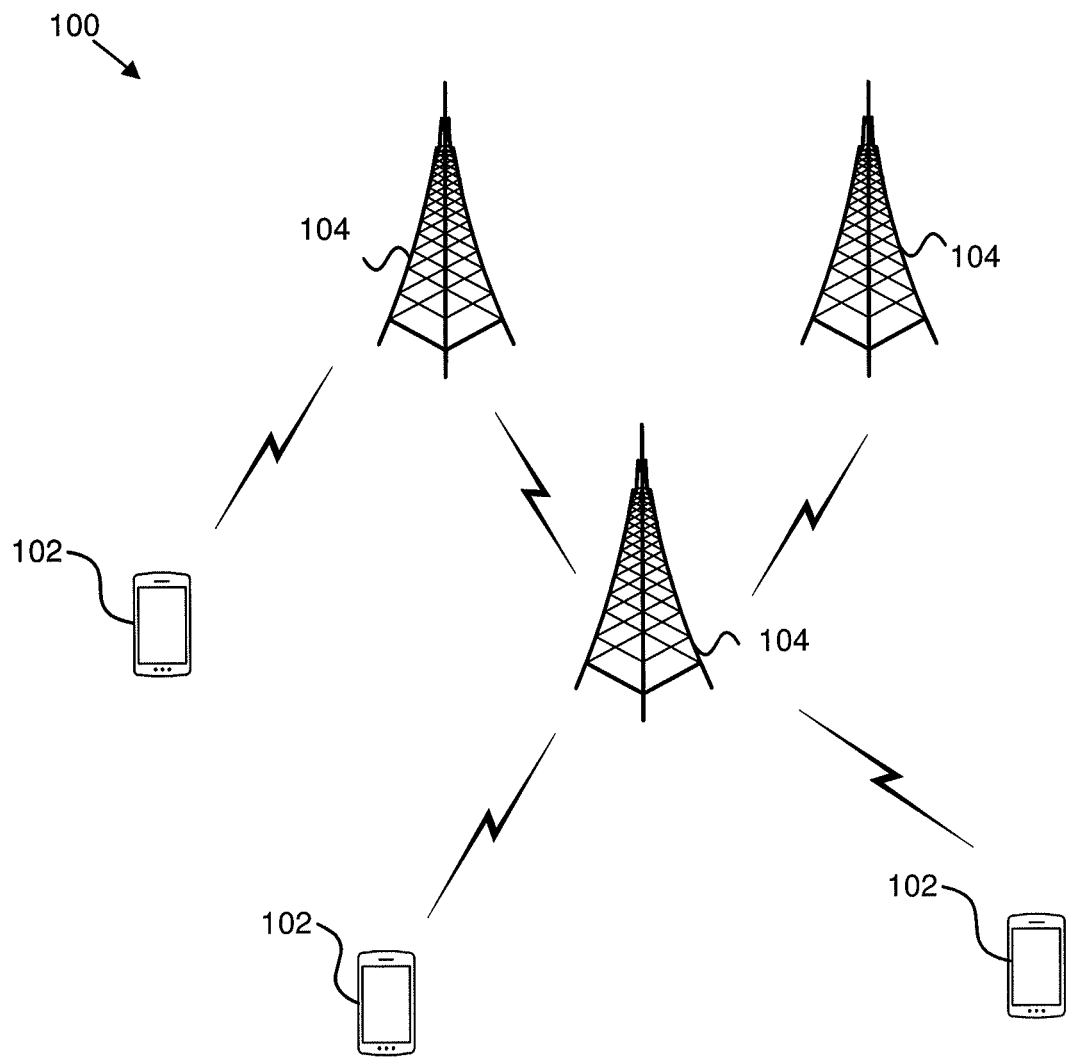
FIG. 1 is a schematic block diagram illustrating one embodiment of a wireless communication system for channel state information calculation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for channel state information calculation. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive information indicating at least one channel state information reference signal resource for channel measurement transmitted from a first transmission resource and at least one non-zero-power channel state information reference signal resource for interference measurement transmitted from a second transmission resource. In certain embodiments, the remote unit 102 may determine a channel state information reference signal resource of the at least one channel state information reference signal resource and a non-zero-power channel state information reference signal resource of the at least one non-zero-power channel state information reference signal resource for calculating channel state information. In some embodiments, the remote unit 102 may calculate the channel state information based on the channel state information reference signal resource and the non-zero-power channel state information reference signal resource. In such embodiments, the channel state information reference signal resource and the non-zero-power channel state information reference signal resource are received using a receiving spatial filter. In various embodiments, the remote unit 102 may transmit the channel state information. Accordingly, a remote unit 102 may be used for channel state information calculation.

In certain embodiments, a network unit 104 may transmit information indicating at least one channel state information reference signal resource for channel measurement transmitted from a first transmission resource and at least one non-zero-power channel state information reference signal resource for interference measurement transmitted from a second transmission resource. In some embodiments, the network unit 104 may transmit quasi-colocation information corresponding to the first transmission resource. In certain embodiments, the network unit 104 may receive channel state information calculated based on a channel state information reference signal resource of the at least one channel state information reference signal resource and a non-zero-power channel state information reference signal resource of the at least one non-zero-power channel state information reference signal resource. Accordingly, a network unit 104 may be used for channel state information calculation.

Figure 2:
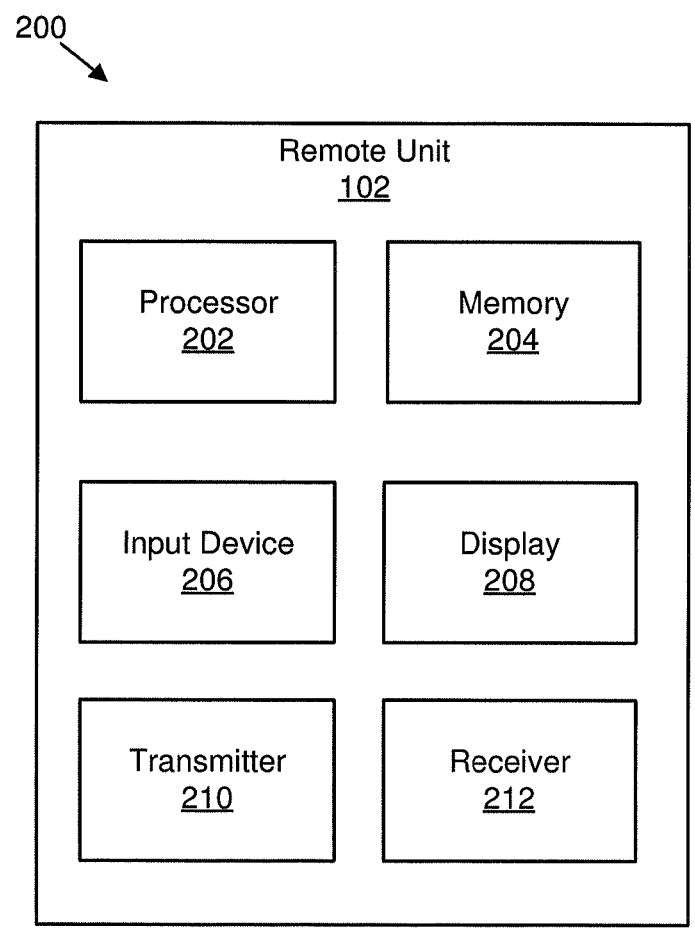
FIG. 2 is a schematic block diagram illustrating one embodiment of an apparatus that may be used for channel state information calculation.

FIG. 2 depicts one embodiment of an apparatus 200 that may be used for channel state information calculation. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202: determines a channel state information reference signal resource of at least one channel state information reference signal resource and a non-zero-power channel state information reference signal resource of at least one non-zero-power channel state information reference signal resource for calculating channel state information; and calculates the channel state information based on the channel state information reference signal resource and the non-zero-power channel state information reference signal resource. In such embodiments, the channel state information reference signal resource and the non-zero-power channel state information reference signal resource are received using a receiving spatial filter. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In some embodiments, the receiver 212 may receive information indicating at least one channel state information reference signal resource for channel measurement transmitted from a first transmission resource and at least one non-zero-power channel state information reference signal resource for interference measurement transmitted from a second transmission resource. In certain embodiments, the transmitter 210 may transmit channel state information. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
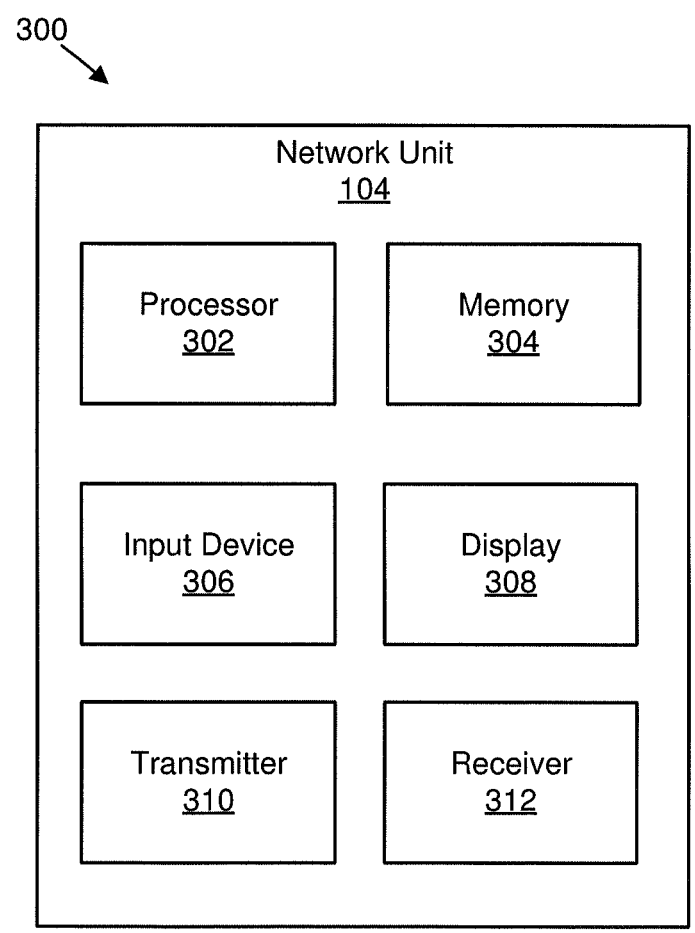
FIG. 3 is a schematic block diagram illustrating one embodiment of an apparatus that may be used for channel state information calculation.

FIG. 3 depicts one embodiment of an apparatus 300 that may be used for channel state information calculation. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the transmitter 310: transmits information indicating at least one channel state information reference signal resource for channel measurement transmitted from a first transmission resource and at least one non-zero-power channel state information reference signal resource for interference measurement transmitted from a second transmission resource; and transmits quasi-colocation information corresponding to the first transmission resource. In various embodiments, the receiver 312 receives channel state information calculated based on a channel state information reference signal resource of the at least one channel state information reference signal resource and a non-zero-power channel state information reference signal resource of the at least one non-zero-power channel state information reference signal resource.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various configurations, CSI feedback may be used for coordinated scheduling for multi-panel, multi-TRP, and/or multi-beam DL transmission. In some configurations, multi-TRP transmission is used as CoMP. In certain configurations, a UE is configured with multiple NZP-CSI-RS resources. In various configurations, a CSI process includes an NZP-CSI-RS process as a DL transmission signal and another zero power CSI resource ("CSI-IM") for interference measurement. In such configurations, a UE may provide CSI feedback (e.g., RI, PMI, and/or CQI) for this CSI process for a given pair of CSI-RS resources. In certain configurations, a UE may only include PMI of a desired transmission from an NZP-CSI-RS. Accordingly, an effect of the interference from the CSI-IM may only be reflected in CQI. In some configurations, if there are multiple hypothesis for transmission, an eNB may configure multiple CSI processes (e.g., possibly for the combination of potential transmissions of DL CSI-RSs (e.g., PDSCHs)) to evaluate interference between different DL transmissions to multiple UEs.

In various configurations, each gNB schedules transmission to its own UEs based on CSI feedback provided by the UEs. In such configurations, potential interference between different DL transmissions may be estimated at a time in which a gNB configures NZP-CSI-IM or ZP-CSI-IM for different CSI reports. Furthermore, numerous configurations and reports may be needed if all potential transmission configurations are to be explored. This may incur a large overhead for the network and/or for the UE.

In certain embodiments, a UE (e.g., remote unit 102) may be configured with one or more CSI-RS resources for channel measurement, one or more NZP-CSI-IM for interference measurement. In such embodiments, the UE may choose one CSI-RS resource from the one or more CSI-RS resources for potential DL transmission and may determine a CRI. Furthermore, the UE may, based on the chosen CSI-RS resource, compute RI, PMI, and/or CQI and provide such as feedback. Such computing may be based on a configured NZP-CSI-IM of the one or more NZP-CSI-IM. In some embodiments, no QCL information may be provided for the one or more CSI-RS resources and/or the one or more NZP-CSI-IM.

In some embodiments, to reduce a number of CSI reporting configurations for coordinated scheduling to DL transmission for multiple UEs, a UE may provide CSI feedback not only on PMI on a spatial direction of an intended transmission from a CSI-RS resource, but also PMI or CRI as an indication for a null-direction for a channel from a gNB to the UE.

Figure 4:
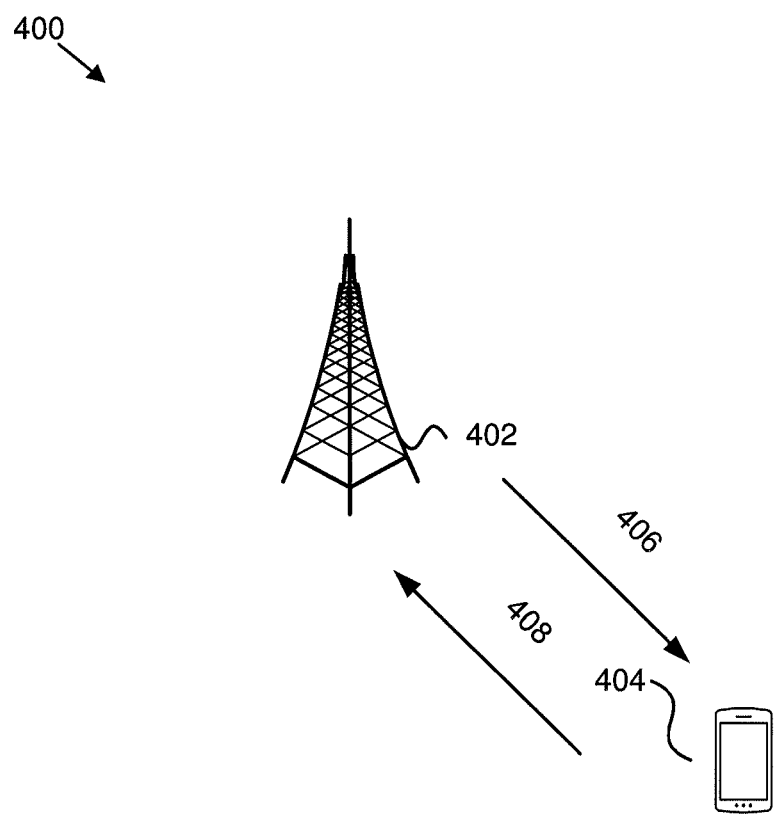
FIG. 4 is a schematic block diagram illustrating one embodiment of a system for CSI estimation and reporting using a single UE.

FIG. 4 is a schematic block diagram illustrating one embodiment of a system 400 for CSI estimation and reporting using a single UE. The system 400 includes a first TRP 402 and a first UE 404. The first TRP 402 transmits a first CSI-RS resource 406 to the first UE 404. The first UE 404 uses the first CSI-RS resource 406 for channel measurement and the first UE 404 provides first CSI feedback 408 determined based on the channel measurement to the first TRP 402.

In certain embodiments, only pmi($v_1$) is included in the first CSI feedback 408. However, pmi($v_N$) may be added to the first CSI feedback 408. In some embodiments, pmi($v_1$) may indicate a strong direction of a signal (e.g., strongest) and/or pmi($v_N$) may indicate a weak direction of the signal (e.g., weakest). According, the first TRP 402 may learn not only a strong direction of the signal, but also a weak direction of the signal. This information may enable the first TRP 402 to schedule DL transmission for multiple UEs with minimal mutual interference. In a CSI-report configuration, the first TRP 402 may configure the first UE 404 to provide a weak PMI based on a particular NZP-CSI-RS, such as a NZP-CSI-RS for interference measurement.

Figure 5:
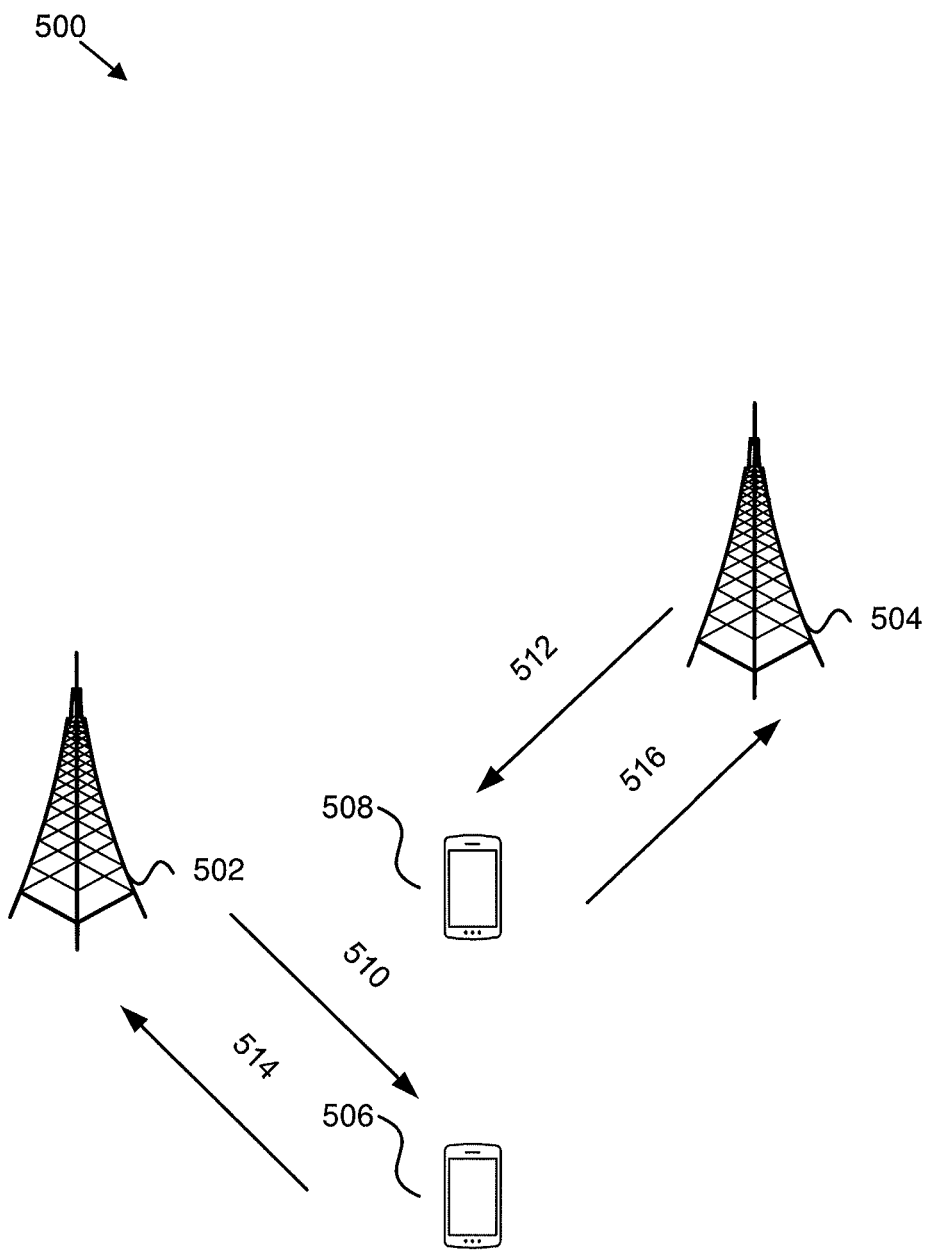
FIG. 5 is a schematic block diagram illustrating one embodiment of a system for CSI feedback by UEs to two TRPs.

FIG. 5 is a schematic block diagram illustrating one embodiment of a system 500 for CSI feedback by UEs to two TRPs. The system 500 includes a first TRP 502, a second TRP 504, a first UE 506, and a second UE 508. The first TRP 502 transmits a first CSI-RS resource 510 to the first UE 506. Moreover, the second TRP 504 transmits a second CSI-RS resource 512 to the second UE 508. The first UE 506 uses the first CSI-RS resource 510 for channel measurement and the second CSI-RS resource 512 for interference measurement and the first UE 506 provides first CSI feedback 514 based on the channel measurement and the interference measurement to the first TRP 502. Furthermore, the second UE 508 uses the second CSI-RS resource 512 for channel measurement and the first CSI-RS resource 510 for interference measurement and the second UE 508 provides second CSI feedback 516 based on the channel measurement and the interference measurement to the second TRP 504.

As may be appreciated, the first TRP 502 and the second TRP 504 may coordinate their transmissions. In some embodiments, the first CSI feedback 514 and/or the second CSI feedback 516 may indicate a strong direction of a signal and/or a weak direction of the signal. In certain embodiments, the first TRP 502 and the second TRP 504 may coordinate their DL transmission. While a first TRP 502 and a second TRP 504 are illustrated in FIG. 5 as being separate, in some embodiment, the first TRP 502 and the second TRP 504 may be replaced by a first and second panel from a single TRP.

Table 1 illustrates one embodiment of resources used by the first UE 506 and the second UE 508 for determining the first CSI feedback 514 and the second CSI feedback 516.

TABLE 1

| | Resources for Determining CSI Feedback | | CSI Feedback | | |
|---|---|---|---|---|---|
| | | | Strong PMI | Weak PMI Based on | Other CSI Feedback Fields Based |
| | CSI-RS Resource for Channel Measurement | NZP-CSI-RS Resource for Interference Measurement | Based on CSI-RS Resource for Channel Measurement | NZP-CSI-RS Resource for Interference Measurement | on CSI-RS Resource for Channel Measurement |
| First UE 506 | First CSI-RS Resource 510 | Second CSI-RS Resource 512 | $PMI^s_1$ | $PMI^n_1$ | RI, CQI |
| Second UE 508 | Second CSI-RS Resource 512 | First CSI-RS Resource 510 | $PMI^s_2$ | $PMI^n_2$ | RI, CQI |

In some embodiments, a UE includes in its CSI feedback the following fields: (CRI (if configured by a gNB), RI, $PMI^s$, CQI, $PMI^n$). Accordingly, the CSI feedback may be different from embodiments that only include a single TRP. With multiple TRPs, the UEs provide a weak PMI based on a CSI-RS for interference measurement. In some embodiments, if multiple TRPs are controlled by a same gNB, the gNB may learn the CSI feedbacks from all the UEs and the gNB may pair the UEs based on their mutual interference. Therefore, the gNB may schedule UE transmissions as MU-MIMO transmissions with minimal mutual interference.

For a certain frequency range, the first CSI-RS resource 510 and the second CSI-RS resource 512 may have different QCL relationships. As may be appreciated, at a time in which the first UE 506 conducts CSI measurement using a CSI-RS resource for channel measurement (e.g., using the first CSI-RS resource 510), it is assumed to measure the interference (e.g., from the second CSI-RS resource 512) using a same RX beam as it uses for channel management, even if the first CSI-RS resource 510 and the second CSI-RS resource 512 are transmitted in different symbols. This way the first UE 506 estimates the interference caused by the second CSI-RS resource 512 at a time in which it is receiving PDSCH from the first TRP 502 on the first CSI-RS resource 510, and the second UE 508 estimates the interference caused by the first CSI-RS resource 510 at a time in which it is receiving PDSCH from the second TRP 504 on the second CSI-RS resource 512.

Figure 6:
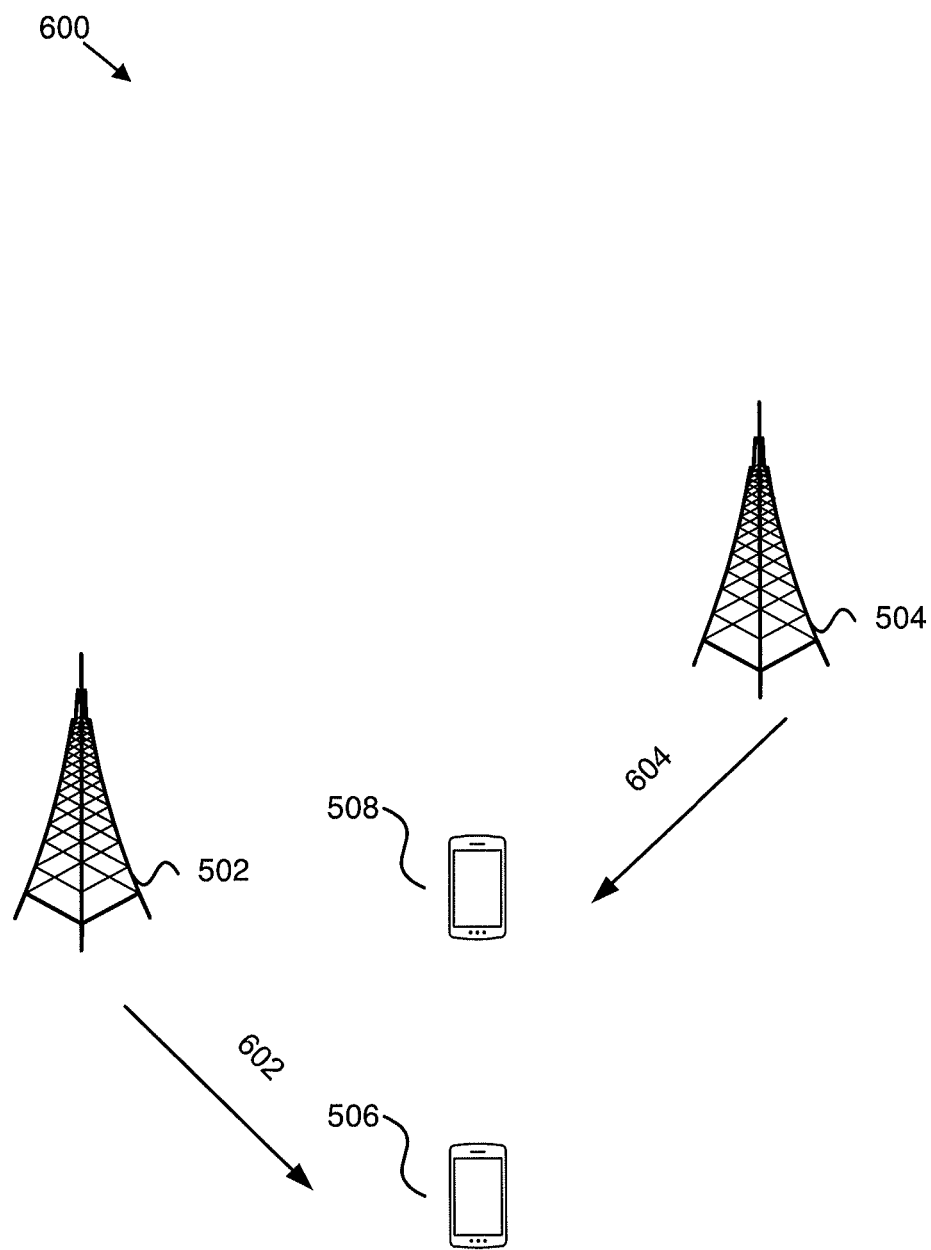
FIG. 6 is a schematic block diagram illustrating one embodiment of a system for multi-TRP transmission to multiple UEs based on CSI feedback.

FIG. 6 is a schematic block diagram illustrating one embodiment of a system 600 for multi-TRP transmission to multiple UEs based on CSI feedback. The system 600 includes the first TRP 502, the second TRP 504, the first UE 506, and the second UE 508. The first TRP 502 transmits resource 704 may be beamformed from the first TRP 502. Furthermore, the third CSI-RS resource 706 and the fourth CSI-RS resource 708 may be beamformed from the second TRP 504.

Table 2 illustrates one embodiment of resources used by the first UE 506 and the second UE 508 for determining the first CSI feedback 710 and the second CSI feedback 712 using two CSI-RS resources for channel measurement and two CSI-RS resources for interference measurement.

TABLE 2

|  | Resources for Determining CSI Feedback | | CSI Feedback | | |
|---|---|---|---|---|---|
|  | CSI-RS Resources for Channel Measurement | NZP-CSI-RS Resources for Interference Measurement | Strong CRI Based on CSI-RS Resources for Channel Measurement, and PMI if Configured | Weak CRI Based on NZP-CSI-RS Resources for Interference Measurement | Other CSI Feedback Fields Based on CSI-RS Resources for Channel Measurement |
| First UE 506 | First CSI-RS Resource 702, Second CSI-RS Resource 704 | Third CSI-RS Resource 706, Fourth CSI-RS Resource 708 | $CRI^s_1$, $PMI^s_1$ | $CRI^n_1$ | RI, CQI |
| Second UE 508 | Third CSI-RS Resource 706, Fourth CSI-RS Resource 708 | First CSI-RS Resource 702, Second CSI-RS Resource 704 | $CRI^s_2$, $PMI^s_2$ | $CRI^n_2$ | RI, CQI | transmissions 602 to the first UE 506 based on $PMI^s_1$ and/or $PMI^n_1$. Moreover, the second TRP 504 transmits transmissions 604 to the second UE 508 based on $PMI^s_2$ and/or $PMI^n_2$.

Figure 7:
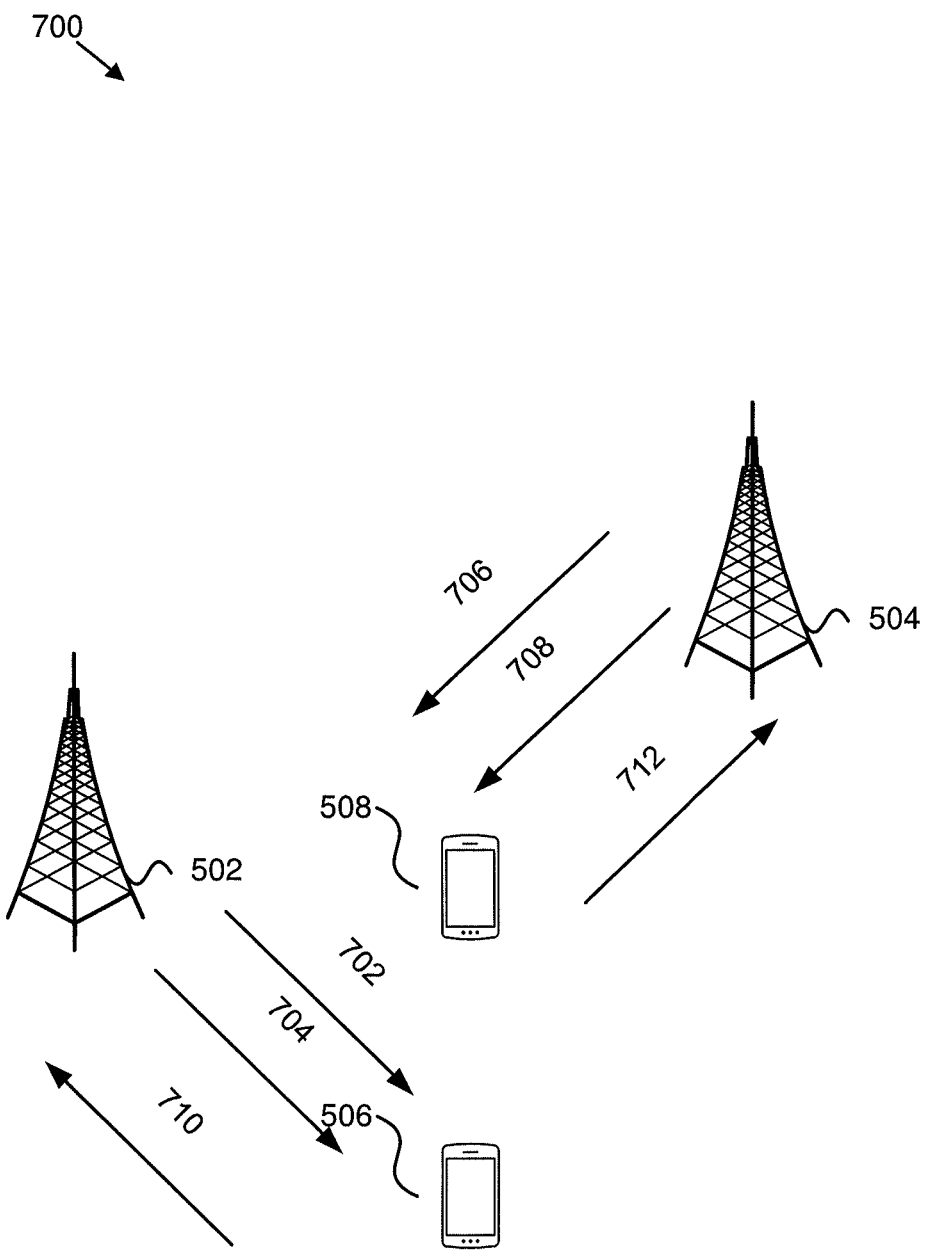
FIG. 7 is a schematic block diagram illustrating another embodiment of a system for CSI feedback by UEs to two TRPs.

FIG. 7 is a schematic block diagram illustrating another embodiment of a system 700 for CSI feedback by UEs to two TRPs. The system 700 includes the first TRP 502, the second TRP 504, the first UE 506, and the second UE 508. The first TRP 502 transmits a first CSI-RS resource 702 (e.g., CSI-RS1) and a second CSI-RS resource 704 (e.g., CSI-RS1') to the first UE 506. Moreover, the second TRP 504 transmits a third CSI-RS resource 706 (e.g., CSI-RS2) and a fourth CSI-RS resource 708 (e.g., CSI-RS2') to the second UE 508. The first UE 506 uses the first CSI-RS resource 702 and the second CSI-RS resource 704 for channel measurement, the third CSI-RS resource 706 and the fourth CSI-RS resource 708 for interference measurement, and the first UE 506 provides first CSI feedback 710 based on the channel measurement and the interference measurement to the first TRP 502. Furthermore, the second UE 508 uses the third CSI-RS resource 706 and the fourth CSI-RS resource 708 for channel measurement, the first CSI-RS resource 702 and the second CSI-RS resource 704 for interference measurement, and the first second UE 508 provides second CSI feedback 712 based on the channel measurement and the interference measurement to the second TRP 504.

As may be appreciated, the first TRP 502 and the second TRP 504 may coordinate their transmissions. In some embodiments, the first CSI feedback 710 and/or the second CSI feedback 712 may indicate a strong CRI and/or a weak CRI. In certain embodiments, the first TRP 502 and the second TRP 504 may coordinate their DL transmission. While a first TRP 502 and a second TRP 504 are illustrated in FIG. 7 as being separate, in some embodiment, the first TRP 502 and the second TRP 504 may be replaced by a first and second panel from a single TRP. It should be noted that the first CSI-RS resource 702 and the second CSI-RS In some embodiments, a UE includes in its CSI feedback the following fields: ($CRI^s$, RI, $PMI^s$ (if configured by a gNB), CQI, $CRI^n$). Accordingly, the CSI feedback may be different from embodiments that only include a single TRP. With multiple TRPs, the UEs provide a weak CRI based on a CSI-RS for interference measurement. In some embodiments, if multiple TRPs are controlled by a same gNB, the gNB may learn the CSI feedbacks from all the UEs and the gNB may pair the UEs based on their mutual interference. Therefore, the gNB may schedule UE transmissions as MU-MIMO transmissions with minimal mutual interference.

If PMIs are provided in the feedback together with $CRI^s$, a gNB may use the PMI for DL transmission. If no PMI is provided, the gNB may either transmit using the CSI-RS ports directly (e.g., using the identity matrix as precoding matrix), or start a next round of CSI configuration, measurement, and report as described herein in which a single CSI-RS resource for channel acquisition is based on CRI feedback $CRI^s$, and a single NZP-CSI-RS for interference measurement is based on the CRI feedback $CRI^n$.

For a certain frequency range, each time a UE computes the CSI of a certain transmission-interference determination (e.g., for the first UE 506, one determination only uses the first CSI-RS resource 702 for channel measurement, and only uses the fourth CSI-RS resource 708 for interference measurement), the UE always uses the same RX beam as it uses for the CSI-RS for channel measurement (e.g., the first CSI-RS resource 702 in this example). This way a UE estimates correctly the interference it will receive when it receives the PDSCH from the first CSI-RS resource 702.

Figure 8:
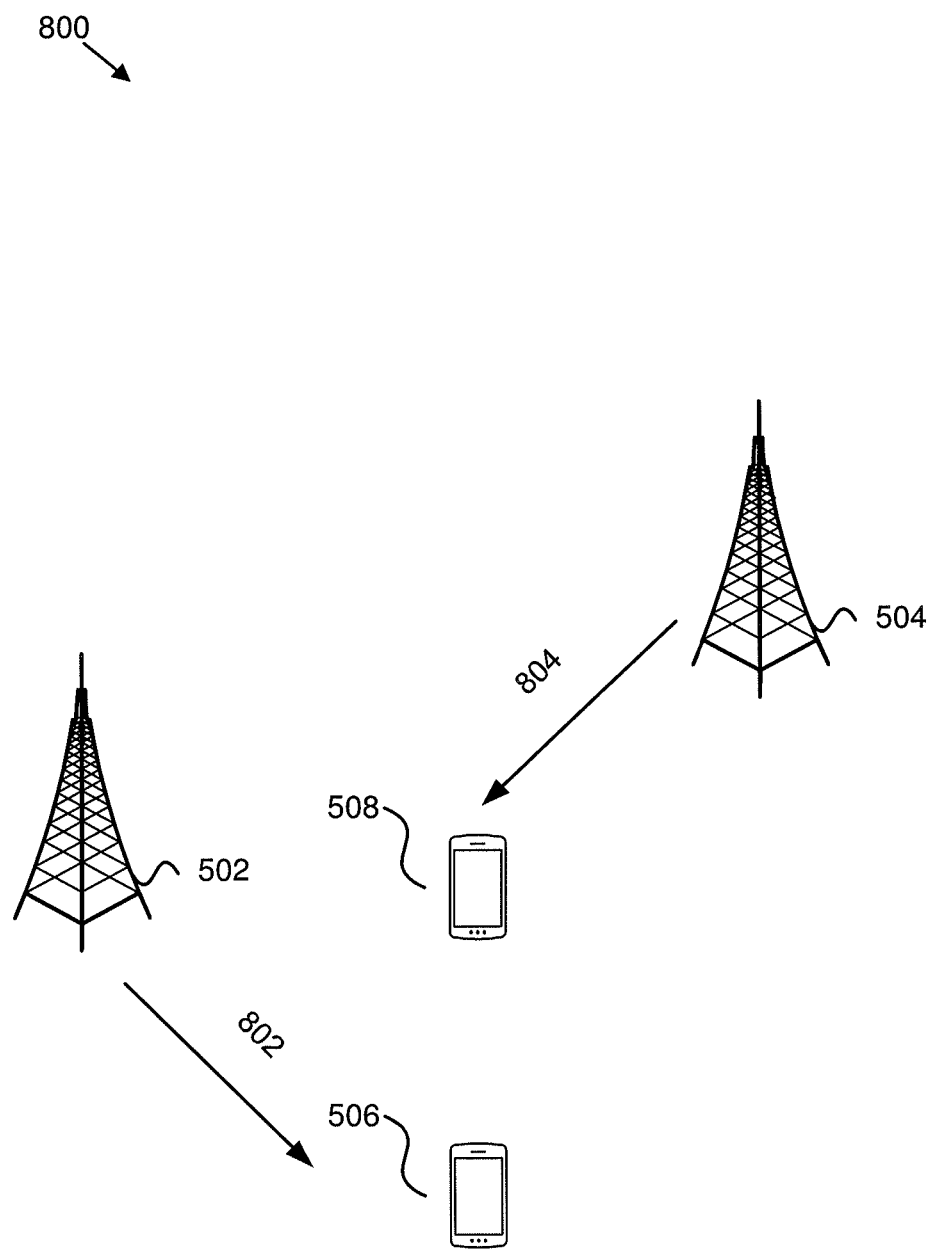
FIG. 8 is a schematic flow chart diagram illustrating another embodiment of a system for multi-TRP transmission to multiple UEs based on CSI feedback.

FIG. 8 is a schematic flow chart diagram illustrating another embodiment of a system 800 for multi-TRP transmission to multiple UEs based on CSI feedback. The system 800 includes the first TRP 502, the second TRP 504, the first UE 506, and the second UE 508. The first TRP 502 transmits transmissions 802 to the first UE 506 based on $CRI^s_1$ and/or $CRI^n_1$. Moreover, the second TRP 504 transmits transmissions 804 to the second UE 508 based on $CRI^s_2$ and/or $CRI^n_2$.

Figure 9:
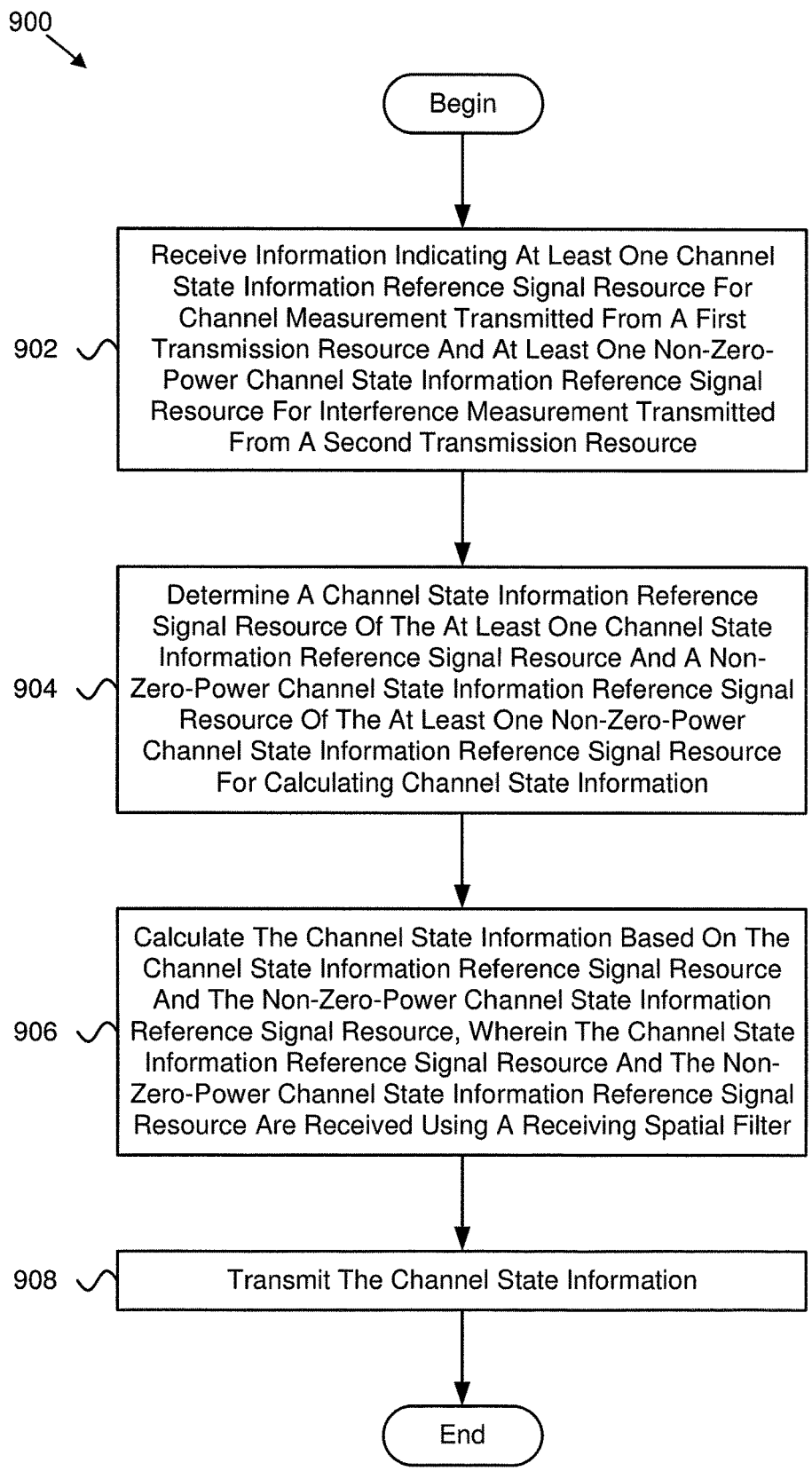
FIG. 9 is a schematic flow chart diagram illustrating one embodiment of a method for channel state information calculation.

FIG. 9 is a schematic flow chart diagram illustrating one embodiment of a method 900 for channel state information calculation. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 information indicating at least one channel state information reference signal resource for channel measurement transmitted from a first transmission resource and at least one non-zero-power channel state information reference signal resource for interference measurement transmitted from a second transmission resource. In certain embodiments, the method 900 includes determining 904 a channel state information reference signal resource of the at least one channel state information reference signal resource and a non-zero-power channel state information reference signal resource of the at least one non-zero-power channel state information reference signal resource for calculating channel state information. In some embodiments, the method 900 includes calculating 906 the channel state information based on the channel state information reference signal resource and the non-zero-power channel state information reference signal resource. In such embodiments, the channel state information reference signal resource and the non-zero-power channel state information reference signal resource are received using a receiving spatial filter. In various embodiments, the method 900 includes transmitting 908 the channel state information.

In certain embodiments, the first transmission resource comprises a first transmission reception point, a first panel, a first beam, or some combination thereof, and the second transmission resource comprises a second transmission reception point, a second panel, a second beam, or some combination thereof. In some embodiments, the receiving spatial filter corresponds to the channel state information reference signal resource. In various embodiments, the receiving spatial filter is determined based on quasi-colocation information corresponding to the first transmission resource.

In one embodiment, the channel state information comprises a first precoding matrix indicator and a second precoding matrix indicator. In certain embodiments, the first precoding matrix indicator is a strong precoding matrix indicator corresponding to the first transmission resource and the second precoding matrix indicator is a weak precoding matrix indicator corresponding to the second transmission resource. In some embodiments, the channel state information comprises a first channel state information reference signal resource indicator corresponding to the first transmission resource and a second channel state information reference signal resource indicator corresponding to the second transmission resource.

In various embodiments, the first channel state information reference signal resource indicator is a strong channel state information reference signal resource indicator and the second channel state information reference signal resource indicator is a weak channel state information reference signal resource indicator.

Figure 10:
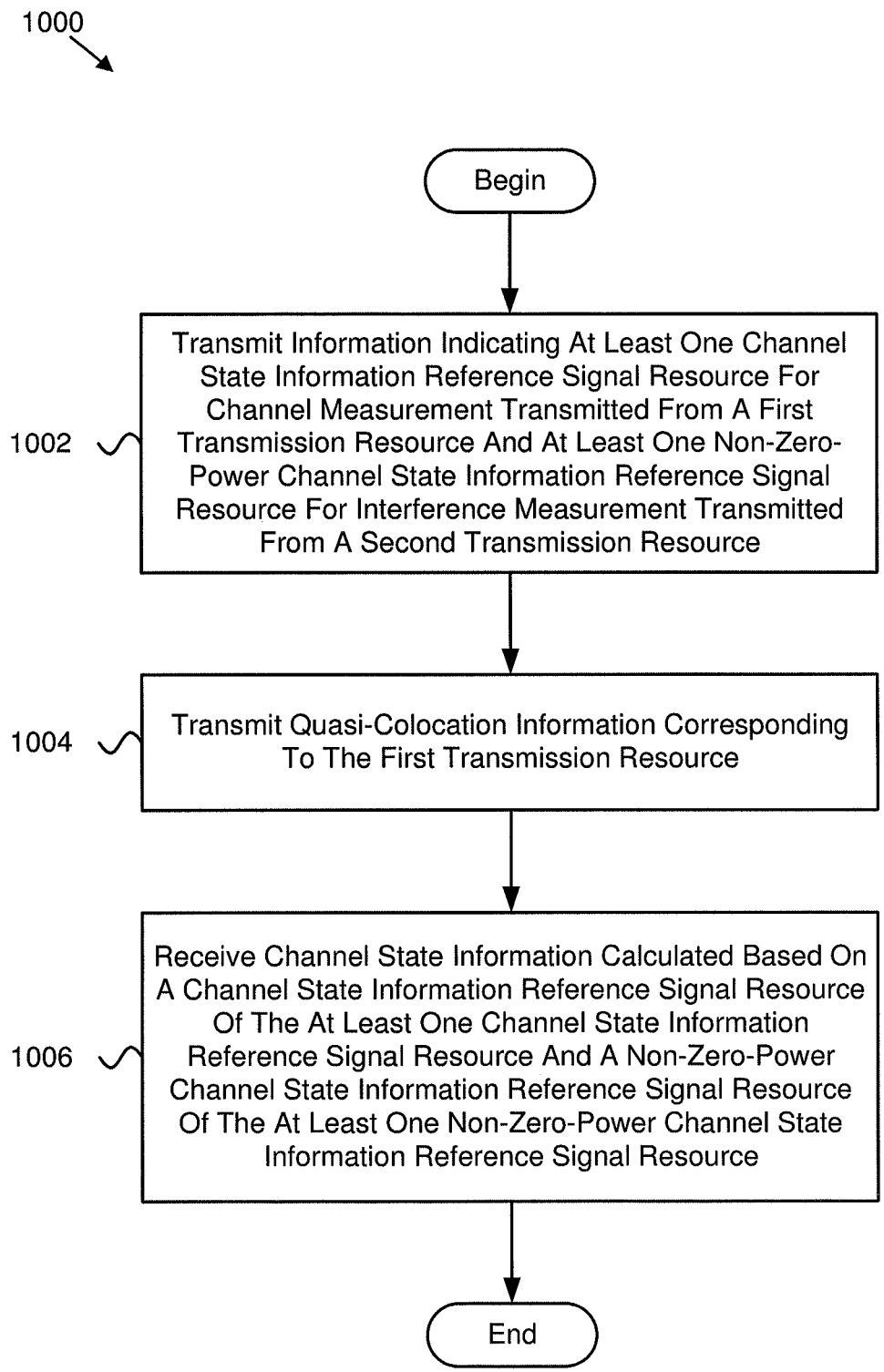
FIG. 10 is a schematic flow chart diagram illustrating another embodiment of a method for channel state information calculation.

FIG. 10 is a schematic flow chart diagram illustrating another embodiment of a method 1000 for channel state information calculation. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 information indicating at least one channel state information reference signal resource for channel measurement transmitted from a first transmission resource and at least one non-zero-power channel state information reference signal resource for interference measurement transmitted from a second transmission resource. In some embodiments, the method 1000 includes transmitting 1004 quasi-colocation information corresponding to the first transmission resource. In certain embodiments, the method 1000 includes receiving 1006 channel state information calculated based on a channel state information reference signal resource of the at least one channel state information reference signal resource and a non-zero-power channel state information reference signal resource of the at least one non-zero-power channel state information reference signal resource.

In certain embodiments, the first transmission resource comprises a first transmission reception point, a first panel, a first beam, or some combination thereof, and the second transmission resource comprises a second transmission reception point, a second panel, a second beam, or some combination thereof. In some embodiments, the channel state information is calculated based on a receiving spatial filter corresponding to the channel state information reference signal resource. In various embodiments, the channel state information comprises a first precoding matrix indicator and a second precoding matrix indicator.

In one embodiment, the first precoding matrix indicator is a strong precoding matrix indicator corresponding to the first transmission resource and the second precoding matrix indicator is a weak precoding matrix indicator corresponding to the second transmission resource. In certain embodiments, the channel state information comprises a first channel state information reference signal resource indicator corresponding to the first transmission resource and a second channel state information reference signal resource indicator corresponding to the second transmission resource. In some embodiments, the first channel state information reference signal resource indicator is a strong channel state information reference signal resource indicator and the second channel state information reference signal resource indicator is a weak channel state information reference signal resource indicator.

In one embodiment, a method comprises: receiving information indicating at least one channel state information reference signal resource for channel measurement transmitted from a first transmission resource and at least one non-zero-power channel state information reference signal resource for interference measurement transmitted from a second transmission resource; determining a channel state information reference signal resource of the at least one channel state information reference signal resource and a non-zero-power channel state information reference signal resource of the at least one non-zero-power channel state information reference signal resource for calculating channel state information; calculating the channel state information based on the channel state information reference signal resource and the non-zero-power channel state information reference signal resource, wherein the channel state information reference signal resource and the non-zero-power channel state information reference signal resource are received using a receiving spatial filter; and transmitting the channel state information.

In certain embodiments, the first transmission resource comprises a first transmission reception point, a first panel, a first beam, or some combination thereof, and the second transmission resource comprises a second transmission reception point, a second panel, a second beam, or some combination thereof.

In some embodiments, the receiving spatial filter corresponds to the channel state information reference signal resource.

In various embodiments, the receiving spatial filter is determined based on quasi-colocation information corresponding to the first transmission resource.

In one embodiment, the channel state information comprises a first precoding matrix indicator and a second precoding matrix indicator.

In certain embodiments, the first precoding matrix indicator is a strong precoding matrix indicator corresponding to the first transmission resource and the second precoding matrix indicator is a weak precoding matrix indicator corresponding to the second transmission resource.

In some embodiments, the channel state information comprises a first channel state information reference signal resource indicator corresponding to the first transmission resource and a second channel state information reference signal resource indicator corresponding to the second transmission resource.

In various embodiments, the first channel state information reference signal resource indicator is a strong channel state information reference signal resource indicator and the second channel state information reference signal resource indicator is a weak channel state information reference signal resource indicator.

In one embodiment, an apparatus comprises: a receiver that receives information indicating at least one channel state information reference signal resource for channel measurement transmitted from a first transmission resource and at least one non-zero-power channel state information reference signal resource for interference measurement transmitted from a second transmission resource; a processor that: determines a channel state information reference signal resource of the at least one channel state information reference signal resource and a non-zero-power channel state information reference signal resource of the at least one non-zero-power channel state information reference signal resource for calculating channel state information; and calculates the channel state information based on the channel state information reference signal resource and the non-zero-power channel state information reference signal resource, wherein the channel state information reference signal resource and the non-zero-power channel state information reference signal resource are received using a receiving spatial filter; and a transmitter that transmits the channel state information.

In certain embodiments, the first transmission resource comprises a first transmission reception point, a first panel, a first beam, or some combination thereof, and the second transmission resource comprises a second transmission reception point, a second panel, a second beam, or some combination thereof.

In some embodiments, the receiving spatial filter corresponds to the channel state information reference signal resource.

In various embodiments, the receiving spatial filter is determined based on quasi-colocation information corresponding to the first transmission resource.

In one embodiment, the channel state information comprises a first precoding matrix indicator and a second precoding matrix indicator.

In certain embodiments, the first precoding matrix indicator is a strong precoding matrix indicator corresponding to the first transmission resource and the second precoding matrix indicator is a weak precoding matrix indicator corresponding to the second transmission resource.

In some embodiments, the channel state information comprises a first channel state information reference signal resource indicator corresponding to the first transmission resource and a second channel state information reference signal resource indicator corresponding to the second transmission resource.

In various embodiments, the first channel state information reference signal resource indicator is a strong channel state information reference signal resource indicator and the second channel state information reference signal resource indicator is a weak channel state information reference signal resource indicator.

In one embodiment, a method comprises: transmitting information indicating at least one channel state information reference signal resource for channel measurement transmitted from a first transmission resource and at least one non-zero-power channel state information reference signal resource for interference measurement transmitted from a second transmission resource; transmitting quasi-colocation information corresponding to the first transmission resource; and receiving channel state information calculated based on a channel state information reference signal resource of the at least one channel state information reference signal resource and a non-zero-power channel state information reference signal resource of the at least one non-zero-power channel state information reference signal resource.

In certain embodiments, the first transmission resource comprises a first transmission reception point, a first panel, a first beam, or some combination thereof, and the second transmission resource comprises a second transmission reception point, a second panel, a second beam, or some combination thereof.

In some embodiments, the channel state information is calculated based on a receiving spatial filter corresponding to the channel state information reference signal resource.

In various embodiments, the channel state information comprises a first precoding matrix indicator and a second precoding matrix indicator.

In one embodiment, the first precoding matrix indicator is a strong precoding matrix indicator corresponding to the first transmission resource and the second precoding matrix indicator is a weak precoding matrix indicator corresponding to the second transmission resource.

In certain embodiments, the channel state information comprises a first channel state information reference signal resource indicator corresponding to the first transmission resource and a second channel state information reference signal resource indicator corresponding to the second transmission resource.

In some embodiments, the first channel state information reference signal resource indicator is a strong channel state information reference signal resource indicator and the second channel state information reference signal resource indicator is a weak channel state information reference signal resource indicator.

In one embodiment, an apparatus comprises: a transmitter that: transmits information indicating at least one channel state information reference signal resource for channel measurement transmitted from a first transmission resource and at least one non-zero-power channel state information reference signal resource for interference measurement transmitted from a second transmission resource; and transmits quasi-colocation information corresponding to the first transmission resource; and a receiver that receives channel state information calculated based on a channel state information reference signal resource of the at least one channel state information reference signal resource and a non-zero-power channel state information reference signal resource of the at least one non-zero-power channel state information reference signal resource.

In certain embodiments, the first transmission resource comprises a first transmission reception point, a first panel, a first beam, or some combination thereof, and the second transmission resource comprises a second transmission reception point, a second panel, a second beam, or some combination thereof.

In some embodiments, the channel state information is calculated based on a receiving spatial filter corresponding to the channel state information reference signal resource.

In various embodiments, the channel state information comprises a first precoding matrix indicator and a second precoding matrix indicator.

In one embodiment, the first precoding matrix indicator is a strong precoding matrix indicator corresponding to the first transmission resource and the second precoding matrix indicator is a weak precoding matrix indicator corresponding to the second transmission resource.

In certain embodiments, the channel state information comprises a first channel state information reference signal resource indicator corresponding to the first transmission resource and a second channel state information reference signal resource indicator corresponding to the second transmission resource.

In some embodiments, the first channel state information reference signal resource indicator is a strong channel state information reference signal resource indicator and the second channel state information reference signal resource indicator is a weak channel state information reference signal resource indicator.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving information indicating at least one channel state information reference signal resource for channel measurement transmitted from a first transmission resource and at least one non-zero-power channel state information reference signal resource for interference measurement transmitted from a second transmission resource;
determining a channel state information reference signal resource of the at least one channel state information reference signal resource and a non-zero-power channel state information reference signal resource of the at least one non-zero-power channel state information reference signal resource for calculating channel state information;
calculating the channel state information based on the channel state information reference signal resource and the non-zero-power channel state information reference signal resource, wherein the channel state information reference signal resource and the non-zero-power channel state information reference signal resource are received using a receiving spatial filter; and
transmitting the channel state information,
wherein the channel state information comprises a strong precoding matrix indicator corresponding to the first transmission resource and a weak precoding matrix indicator corresponding to the second transmission resource and the first transmission resource comprises a separate transmission resource from the second transmission resource.

2. The method of claim 1, wherein:
the first transmission resource comprises a first transmission reception point, a first panel, a first beam, or any combination thereof; and
the second transmission resource comprises a second transmission reception point, a second panel, a second beam, or any combination thereof.

3. The method of claim 1, wherein the receiving spatial filter corresponds to the channel state information reference signal resource.

4. The method of claim 3, wherein the receiving spatial filter is determined based on quasi-colocation information corresponding to the first transmission resource.

5. The method of claim 1, wherein the channel state information comprises a first channel state information reference signal resource indicator corresponding to the first transmission resource and a second channel state information reference signal resource indicator corresponding to the second transmission resource.

6. The method of claim 5, wherein the first channel state information reference signal resource indicator is a strong channel state information reference signal resource indicator and the second channel state information reference signal resource indicator is a weak channel state information reference signal resource indicator.

7. The method of claim 1, wherein the channel state information further comprises a channel state information reference signal indicator corresponding to a null-direction for a channel.

8. The method of claim 1, wherein the channel state information further comprises a precoding matrix indicator corresponding to a null-direction for a channel.

9. A user equipment (UE), comprising:
at least one memory; and
at least one processor coupled with the at least one memory and configured to cause the UE to:
receive information indicating at least one channel state information reference signal resource for channel measurement transmitted from a first transmission resource and at least one non-zero-power channel state information reference signal resource for interference measurement transmitted from a second transmission resource;
determine a channel state information reference signal resource of the at least one channel state information reference signal resource and a non-zero-power channel state information reference signal resource of the at least one non-zero-power channel state information reference signal resource for calculating channel state information;
calculate the channel state information based on the channel state information reference signal resource and the non-zero-power channel state information reference signal resource, wherein the channel state information reference signal resource and the non-zero-power channel state information reference signal resource are received using a receiving spatial filter; and transmit the channel state information,
wherein the channel state information comprises a strong precoding matrix indicator corresponding to the first transmission resource and a weak precoding matrix indicator corresponding to the second transmission resource and the first transmission resource comprises a separate transmission resource from the second transmission resource.

10. The UE of claim 9, wherein;
the first transmission resource comprises a first transmission reception point, a first panel, a first beam, or any combination thereof; and
the second transmission resource comprises a second transmission reception point, a second panel, a second beam, or any combination thereof.

11. The UE of claim 9, wherein the receiving spatial filter corresponds to the channel state information reference signal resource.

12. The UE of claim 11, wherein the receiving spatial filter is determined based on quasi-colocation information corresponding to the first transmission resource.

13. A method performed by a base station, the method comprising:
transmitting information indicating at least one channel state information reference signal resource for channel measurement transmitted from a first transmission resource and at least one non-zero-power channel state information reference signal resource for interference measurement transmitted from a second transmission resource;
transmitting quasi-colocation information corresponding to the first transmission resource; and
receiving channel state information calculated based on a channel state information reference signal resource of the at least one channel state information reference signal resource and a non-zero-power channel state information reference signal resource of the at least one non-zero-power channel state information reference signal resource,
wherein the channel state information comprises a strong precoding matrix indicator corresponding to the first transmission resource and a weak precoding matrix indicator corresponding to the second transmission resource and the first transmission resource comprises a separate transmission resource from the second transmission resource.

14. The method of claim 13, wherein:
the first transmission resource comprises a first transmission reception point, a first panel, a first beam, or any combination thereof; and
the second transmission resource comprises a second transmission reception point, a second panel, a second beam, or any combination thereof.

15. The method of claim 13, wherein the channel state information is calculated based on a receiving spatial filter corresponding to the channel state information reference signal resource.

16. The method of claim 13, wherein the channel state information comprises a first channel state information reference signal resource indicator corresponding to the first transmission resource and a second channel state information reference signal resource indicator corresponding to the second transmission resource.

17. The method of claim 16, wherein the first channel state information reference signal resource indicator is a strong channel state information reference signal resource indicator and the second channel state information reference signal resource indicator is a weak channel state information reference signal resource indicator.

18. A base station, comprising:
at least one memory; and
at least one processor coupled with the at least one memory and configured to cause the base station to:
transmit information indicating at least one channel state information reference signal resource for channel measurement transmitted from a first transmission resource and at least one non-zero-power channel state information reference signal resource for interference measurement transmitted from a second transmission resource;
transmit quasi-colocation information corresponding to the first transmission resource; and
receive channel state information calculated based on a channel state information reference signal resource of the at least one channel state information reference signal resource and a non-zero-power channel state information reference signal resource of the at least one non-zero-power channel state information reference signal resource,
wherein the channel state information comprises a strong precoding matrix indicator corresponding to the first transmission resource and a weak precoding matrix indicator corresponding to the second transmission resource and the first transmission resource comprises a transmission resource separate from the second transmission resource.

\* \* \* \* \*